Sept. 24, 1957  A. A. HEMPHILL ET AL  2,807,801
MEANS FOR REDUCING LEAKAGE INDUCTANCE IN MAGNETIC ANTENNAS
Filed March 22, 1954  2 Sheets-Sheet 1

ALFRED A. HEMPHILL
JOHN M. TEWKSBURY
*INVENTORS*

BY

*Killman and Kerst*
ATTORNEYS

Sept. 24, 1957  A. A. HEMPHILL ET AL  2,807,801
MEANS FOR REDUCING LEAKAGE INDUCTANCE IN MAGNETIC ANTENNAS
Filed March 22, 1954 2 Sheets-Sheet 2

ALFRED A. HEMPHILL
JOHN M. TEWKSBURY
INVENTORS

BY

Killman and Kerst
ATTORNEYS

United States Patent Office 2,807,801
Patented Sept. 24, 1957

2,807,801

MEANS FOR REDUCING LEAKAGE INDUCTANCE IN MAGNETIC ANTENNAS

Alfred A. Hemphill, Baltimore, and John M. Tewksbury, Lutherville, Md., assignors to Bendix Aviation Corporation, Towson, Md., a corporation of Delaware Application March 22, 1954, Serial No. 417,612

3 Claims. (Cl. 343—788)

This invention relates to magnetic antennas and more particularly to means for reducing the inductance of the pickup coil of such an antenna due to the presence of leakage flux paths linking the coil.

This invention has particular application to magnetic antennas arranged for the derivation of directional indications, such, for example, as those disclosed in U. S. patent applications, Serial No. 264,717 for "Magnetic Antenna System," filed January 2, 1952 by Alfred A. Hemphill and Serial No. 417,613, filed March 22, 1954 by Alfred A. Hemphill and John M. Tewksbury.

In antennas of this type, using elongated collector bars of high permeability arranged radially about a coil wound on a highly permeable rotatable core, as the coil is rotated past the pole pieces the leakage flux through pole pieces of collector bars which are in positions of minimum pick-up increases the inductance of the coil. When these flux paths pass through only one pole piece the inductance of the coil is increased to a greater extent than when the flux paths include portions of more than one pole piece and the air gap between them. This differing inductance affects the pick-up, introducing distortion into the directional indication and tending to mask the null indication. When the antenna is being used for reception without reference to the indication of direction the effect of the leakage flux to reduce the pick-up is still undesirable.

It is an object of this invention to provide a means for effectively reducing the leakage inductance and the variation thereof occurring under the above circumstances.

It is a further object of the invention to provide this reduction by means which is inexpensive and simple to add to the antenna.

It is another object of the invention to provide means of this type which does not introduce significant errors into the system.

These and other objects and advantages of the invention may be realized by the provision of a shorted conductive turn about each pole piece, extending radially with respect to the coil and centered on the pole piece.

Figure 1:
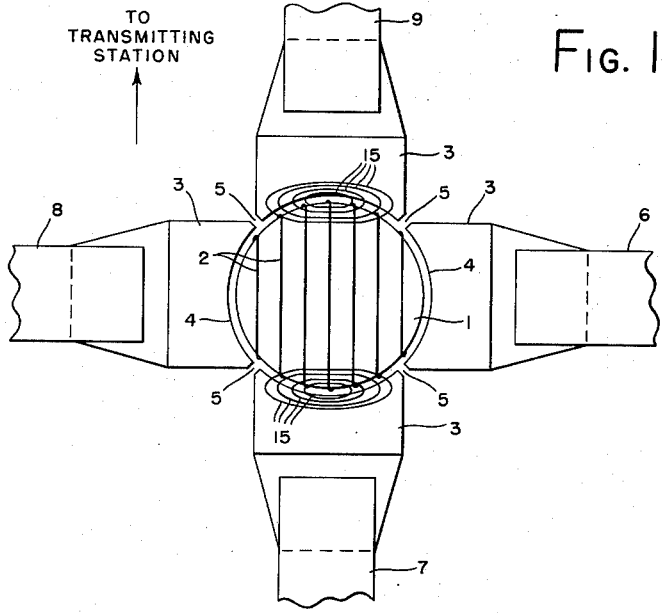
Fig. 1 is a plan view of a magnetic antenna of the type disclosed in the aforesaid application Serial No. 417,613 showing leakage flux paths.

Referring now more particularly to the drawing, there is shown in Fig. 1 an antenna of the type disclosed in said application Serial No. 417,613 having a circular rotary core 1 with a pick-up coil 2 wound therearound. Positioned symmetrically about the core 1 are four pole pieces 3, having their faces 4 adjacent the core curved concentrically with the periphery of the core. The pole pieces are separated by air gaps 5 of identical dimensions.

Associated with each of the pole pieces is a respective collector bar 6, 7, 8 or 9. The pole pieces have formed in their upper outer portions a step having a vertical surface 10 and a horizontal surface 11. The inner end of each collector bar is formed with a similar but upwardly directed step leaving an overhanging portion 12 fitting into the step in the pole piece. The collector bars, pole pieces and core are formed of highly permeable material as indicated in the application referred to above.

Figure 4:
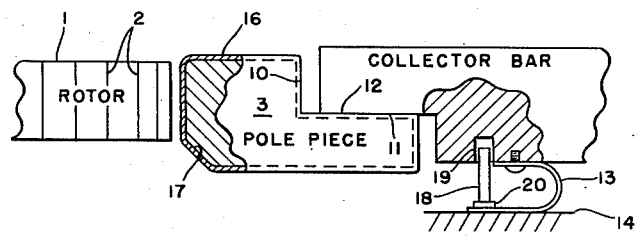

Means are provided for holding the inner ends of the collector bars in their overlapped relationship with respect to said pole pieces. Such means are illustrated in Fig. 4, by way of example as the U-shaped springs 13, each having one of its arms secured to the lower surface of one of the collector bars. The other arm is mounted to pivot about a pin 18 which is secured in a fixed surface 14 located below the antenna. The upper end of the pin fits loosely into a hole 19 formed in the lower part of the collector bar. The lower arm of the spring is confined below a collar 20 on the pin 18. In the operation of this structure the collector bar can be angularly moved about the pin 18 as a pivot while being held down into contact with the surface 11 of the pole piece.

In the use of an antenna arrangement such as is illustrated in Fig. 1, the rotor is rotated with respect to the collector bars to find a position of minimum signal pick-up or the so-called null point of the signal which is sharp and thus defines the direction of the transmitting station. In positions other than this null position the rotor will pick-up a signal which will gradually increase in intensity as the rotor is turned from the null position until it passes through a broad region of substantially maximum signal about ninety degrees from the null position. Upon continued rotation the signal will decrease until another null point is reached.

While the above description of the operation of the antenna indicates the presence of a sharp null point in the sensitivity pattern thereof, there is present in practice an effect which tends to obscure the null and produce a distorted output and displacement of the null.

In the illustration of Fig. 1 let it be assumed that the collector bar 9 is pointed in the direction of the transmitting station as indicated by the arrow accompanying the figure. The flux set up in the collector bars by the magnetic field of the wave advancing from the station will be a maximum through bars 6 and 8 and a minimum through bars 7 and 9. With the orientation of the core and coil shown the flux passing through the rotor should cause a maximum current flow through the coil and hence a maximum pick-up.

However, there will be a certain amount of leakage flux, as indicated by the closed lines 15, flowing through the core 1 and the pole pieces 3 associated with collector bars 7 and 9. This flux will increase the inductance of the coil. The change of inductance in the coil will impair the match between the coil and the tuned circuit (not shown) normally coupled to the coil in such systems for applying the signal to the remainder of the system. This impairment of the coupling will reduce the maximum pick-up of the system, tending to obscure the null by rendering its sides less steep. The change in inductance also results in the detuning of the above mentioned tuned circuit, causing bearing error because of the non-symmetry of the two slopes of the null.

It should be noted that, in the orientation shown in Fig. 1 and described above, the lines of leakage flux 15 do not traverse any of the air gaps 5, so that the paths are of a low reluctance nature.

Figure 2:
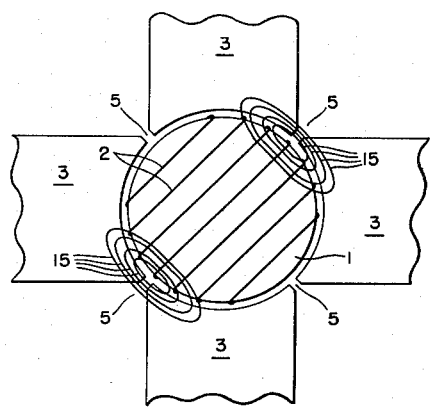
Fig. 2 is a plan view of the rotor and pole pieces of the antenna of Fig. 1 showing the leakage flux paths as they occur when the rotor is rotated.

Assume now that the rotor is rotated in a clockwise direction through an angle of forty-five degrees as indicated in Fig. 2. Now it will be seen that the lines of leakage flux 15 traverse one of the air gaps 5. As a consequence the reluctance of their paths will be increased, with an accompanying decrease in the inductance of the coil 2, and a corresponding change in the coupling between the coil and the tuned circuit of the system coupled thereto.

As the rotor is rotated the inductance of the coil continues to follow this patern, falling when the leakage flux paths pass through an air gap and rising when the paths do not include such a gap. The undulating pattern of distortion which is applied to the pattern of response as a result serves to obscure and displace the null indication and to lower the amplitude of the maximum pick-up. The latter defect is particularly objectionable when the system is being used for communication purposes.

In accordance with the instant invention the defect described above is reduced to such an extent as to be unobjectionable by adding to each of the pole pieces 3 a shorted turn extending radially from the rotor and located on the center line thereof.

Figure 3:
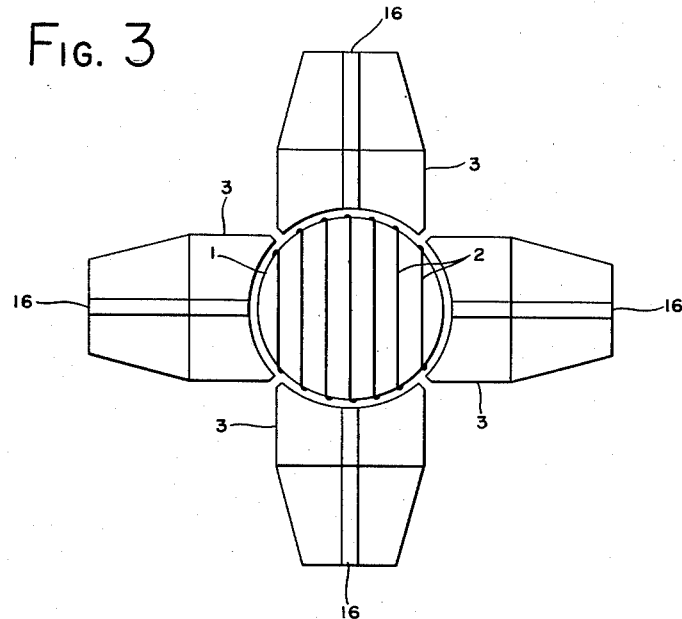
Fig. 3 is a plan view of the antenna of Figs. 1 and 2 modified in accordance with the invention; and, Fig. 4 is an elevational view showing a fragment of the rotor, a pole piece and a fragment of the collector bar associated therewith, of the antenna of Fig. 3.

Such a construction is illustrated in Figs. 3 and 4. In Fig. 3 there is shown a ribbon-like conductor 16 forming a ribbon-like conductor 16 forming a single conductive loop encircling each of the pole pieces 3 at its mid-circumference. The conductor 16 may be a flat ribbon of copper or other highly conductive metal, and in the embodiment shown is received in a groove 17 of the same cross-section, so that the outer surface of the ribbon is flush with the surface of the pole piece.

The effect of the conductors 16 is to increase the reluctance of the leakage flux path through each of the pole pieces 3 when the rotor is so oriented that this flux does not cut one of the air gaps 5. There is thus no longer present a low reluctance path for leakage flux when the rotor is located as in Fig. 1 or in any position differing therefrom by increments of ninety degrees. As a consequence the variation of the inductance of the coil 2 with rotor movement is reduced to a value at which the distortions and reduction of maximum pick-up due to this cause are of little consequence. The presence of the shorted turns improves the sensitivity of the antenna by reducing the leakage of flux and does not introduce any undesirable effect. By keeping the conductors 16 flat and thin there is no appreciable introduction of air gaps between the pole pieces and their respective collector bars even if they are wound on the outer unrecessed surface of the pole piece although for optimum results they should be received in recesses in the manner illustrated.

Although only a single shorted turn is shown about each pole piece, additional turns may be employed if desired. If other shorted turns are used they should be disposed symmetrically about the mid-circumference and all distance between turns and between the outside turns and the air gaps 5 should be equal. A single turn, as shown, will usually suffice to reduce the error to an unobjectionable level.

What is claimed is:

1. In a magnetic antenna comprising a rotor including a pick-up coil surrounding a rotatable highly permeable core; a plurality of high permeability pole pieces symmetrically arranged about the lateral periphery of said rotor and in close proximity thereto, each of said pole pieces being symmetrical about a respective vertical plane and being separated from each adjacent one of said plurality of pole pieces by an air gap, said air gaps being substantially equal; and a plurality of collector bars formed of high permeability material extending radially from said rotor, each of said collector bars having one of its ends positioned in low reluctance relationship to a respective one of said pole pieces; means for reducing and rendering more uniform with rotation of said rotor the inductance of said coil due to leakage flux linking the vertical portions of said coil and said pole pieces, said means comprising: an endless conductor encircling each of said pole pieces, each of said conductors forming a shorted turn about its respective pole piece, said turn throughout its length cutting the plane of symmetry of said pole piece.

2. A magnetic antenna comprising a rotor including a pick-up coil surrounding a rotatable highly permeable core; a plurality of high permeability pole pieces symmetrically arranged about the lateral periphery of said rotor and in close proximity thereto, each of said pole pieces being symmetrical about a respective vertical plane and being separated from each adjacent one of said plurality of pole pieces by an air gap, said air gaps being substantially equal; a plurality of collector bars formed of high permeability material extending radially from said rotor, each of said collector bars having one of its ends positioned in low reluctance relationship to a respective one of said pole pieces; and means forming a shorted conductive turn about each of said pole pieces, said turn throughout its length cutting the plane of symmetry of said pole piece.

3. A magnetic antenna comprising a rotor including a pick-up coil surrounding a rotatable highly permeable core; a plurality of high permeability pole pieces symmetrically arranged about the lateral periphery of said rotor and in close proximity thereto, each of said pole pieces being symmetrical about a respective vertical plane and being separated from each adjacent one of said plurality of pole pieces by an air gap, said air gaps being substantially equal; a plurality of collector bars formed of high permeability material extending radially from said rotor, each of said collector bars having one of its ends positioned in low reluctance relationship to a respective one of said pole pieces; and means increasing the reluctance of each of said pole pieces in a zone extending through said pole piece and symmetrical to said plane of symmetry thereof.

References Cited in the file of this patent

UNITED STATES PATENTS

| 1,823,979 | Jordan | Sept. 22, 1931 |

FOREIGN PATENTS

| 874,946 | France | Aug. 31, 1942 |